United States Patent
Ammerman et al.

(10) Patent No.: US 10,371,438 B2
(45) Date of Patent: Aug. 6, 2019

(54) REFRIGERATOR HAVING INTERIOR LIGHTING USED FOR SYNCHRONIZED USER FEEDBACK OF ZONE SELECTION

(71) Applicant: WHIRLPOOL CORPORATION, Benton Harbor, MI (US)

(72) Inventors: Jason Ammerman, Chicago, IL (US); Jae Kim, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/142,330

(22) Filed: Apr. 29, 2016

(65) Prior Publication Data

US 2017/0314848 A1    Nov. 2, 2017

(51) Int. Cl.
*F25D 27/00* (2006.01)

(52) U.S. Cl.
CPC ...... *F25D 27/005* (2013.01); *F25D 2400/361* (2013.01)

(58) Field of Classification Search
CPC .... F25D 27/005; F25D 27/00; F25D 2327/00; F25D 2331/00; F25D 29/00; F25D 31/00; F25D 17/065; F25D 17/042; F25D 2327/001
USPC ...................... 362/92, 253; 62/264, 125, 127
See application file for complete search history.

(56) References Cited

U.S. PATENT DOCUMENTS

| | | | |
|---|---|---|---|
| 4,843,833 A * | 7/1989 | Polkinghorne | F25D 17/065 62/180 |
| 6,101,819 A * | 8/2000 | Onaka | F25D 29/005 337/327 |
| 6,314,746 B2 | 11/2001 | Ohya et al. | |
| 6,813,896 B1 | 11/2004 | Janke et al. | |
| 7,032,408 B2 * | 4/2006 | Dentella | F25D 17/065 62/187 |
| 7,866,171 B2 * | 1/2011 | Cho | A23L 3/26 362/92 |
| 7,959,313 B2 * | 6/2011 | Park | F25D 27/005 362/231 |

(Continued)

FOREIGN PATENT DOCUMENTS

| | | |
|---|---|---|
| EP | 1887298 A1 | 2/2008 |
| WO | 2006126482 A1 | 11/2006 |
| WO | 2009061076 A2 | 5/2009 |

*Primary Examiner* — Hiwot E Tefera
(74) *Attorney, Agent, or Firm* — Price Heneveld LLP

(57) ABSTRACT

A refrigerator is provided having at least one internal refrigerated compartment in which a plurality of refrigeration zones are provided, wherein an environment in each refrigeration zone may be independently controlled using a user interface configured to receive a zone selection input from a user indicating one of the plurality of refrigeration zones in which the user desires to adjust the environment; a plurality of lights provided in the internal refrigerated compartment and disposed proximate to each of the plurality of refrigeration zones, wherein groups of the plurality of lights may be separately controlled for visually identifying each of the refrigeration zones; and a controller configured to receive a zone selection input from the user interface, identify a group of the plurality of lights that are disposed proximate the selected refrigeration zone, and control the identified group of the plurality of lights to visually confirm the selected refrigeration zone.

19 Claims, 7 Drawing Sheets

(56) References Cited

U.S. PATENT DOCUMENTS

| | | | |
|---|---|---|---|
| 8,777,434 B2* | 7/2014 | Van Beek | F25D 27/00 362/92 |
| 8,813,516 B2* | 8/2014 | Min | F25D 11/02 62/264 |
| 8,980,188 B2* | 3/2015 | Park | A23L 3/28 250/492.1 |
| 9,074,806 B2 | 7/2015 | Cheon et al. | |
| 9,642,214 B2* | 5/2017 | Kendall | H05B 37/0218 |
| 9,795,010 B2* | 10/2017 | Kendall | H05B 37/0218 |
| 2005/0155372 A1* | 7/2005 | Dentella | F25D 17/065 62/441 |
| 2006/0201181 A1* | 9/2006 | Bauer | F21V 33/0044 62/264 |
| 2006/0272341 A1* | 12/2006 | Shin | F25D 29/00 62/126 |
| 2007/0180843 A1* | 8/2007 | Park | A23L 3/26 62/264 |
| 2008/0066475 A1* | 3/2008 | Cho | A23L 3/26 62/130 |
| 2008/0307818 A1* | 12/2008 | Min | F25D 11/02 62/264 |
| 2009/0052160 A1* | 2/2009 | Park | F25D 27/005 362/92 |
| 2010/0320890 A1* | 12/2010 | Jung | F25D 27/00 312/402 |
| 2012/0144855 A1* | 6/2012 | Krause | B01D 29/58 62/331 |
| 2013/0327073 A1 | 12/2013 | Lee et al. | |
| 2014/0111118 A1* | 4/2014 | Kendall | H05B 37/0218 315/362 |
| 2015/0035432 A1* | 2/2015 | Kendall | F25D 27/005 315/76 |
| 2016/0010845 A1* | 1/2016 | Brown | F21V 33/0044 362/551 |
| 2018/0080702 A1* | 3/2018 | Wilson | F25D 11/02 |
| 2018/0080703 A1* | 3/2018 | Wilson | F25D 11/02 |

* cited by examiner

REFRIGERATOR HAVING INTERIOR LIGHTING USED FOR SYNCHRONIZED USER FEEDBACK OF ZONE SELECTION

BACKGROUND

The present device generally relates to refrigerators, and more specifically, to lighting for refrigerators.

SUMMARY

In at least one aspect, a refrigerator is provided comprising: a cabinet having at least one internal refrigerated compartment in which a plurality of refrigeration zones are provided, wherein an environment in each refrigeration zone may be independently controlled; a plurality of lights provided in the internal refrigerated compartment and disposed around boundaries of each of the plurality of refrigeration zones, wherein groups of the plurality of lights may be separately controlled for visually identifying the boundaries of each of the refrigeration zones; a user interface configured to receive a zone selection input from a user indicating at least one of the plurality of refrigeration zones in which the user desires to adjust the environment; and a controller coupled to the plurality of lights and the user interface, the controller is configured to receive a zone selection input from the user interface, identify a group of the plurality of lights that are disposed about the boundary of the selected at least one of the plurality of refrigeration zones, and control the identified group of the plurality of lights in a manner so as to visually confirm the boundaries of the selected at least one of the plurality of refrigeration zones.

In at least another aspect, a refrigerator is provided comprising: a cabinet having at least one internal refrigerated compartment in which a plurality of refrigeration zones are provided, wherein an environment in each refrigeration zone may be independently controlled using a user interface configured to receive a zone selection input from a user indicating at least one of the plurality of refrigeration zones in which the user desires to adjust the environment; a plurality of lights provided in the internal refrigerated compartment and disposed proximate to each of the plurality of refrigeration zones, wherein groups of the plurality of lights may be separately controlled for visually identifying each of the refrigeration zones; and a controller coupled to the plurality of lights and in communication with the user interface, the controller is configured to: receive a zone selection input from the user interface; identify a group of the plurality of lights that are disposed proximate the selected at least one of the plurality of refrigeration zones; and control the identified group of the plurality of lights in a manner so as to visually confirm the selected at least one of the plurality of refrigeration zones.

In at least another aspect, a method is provided for controlling interior lights of an appliance having an internal compartment with a plurality of independently controllable zones, and a user interface for allowing the user to select at least one zone to control, the method comprising: providing a plurality of groups of lights with each group of lights associated with, and located proximate to, a respective one of the independently controllable zones; and when a user selects at least one zone to control using the user interface, changing the appearance of the group of lights associated with the selected at least one zone to visually confirm to the user the selection of the at least one zone.

These and other features, advantages, and objects of the present device will be further understood and appreciated by those skilled in the art upon studying the following specification, claims, and appended drawings.

DETAILED DESCRIPTION OF EMBODIMENTS

Figure 1:
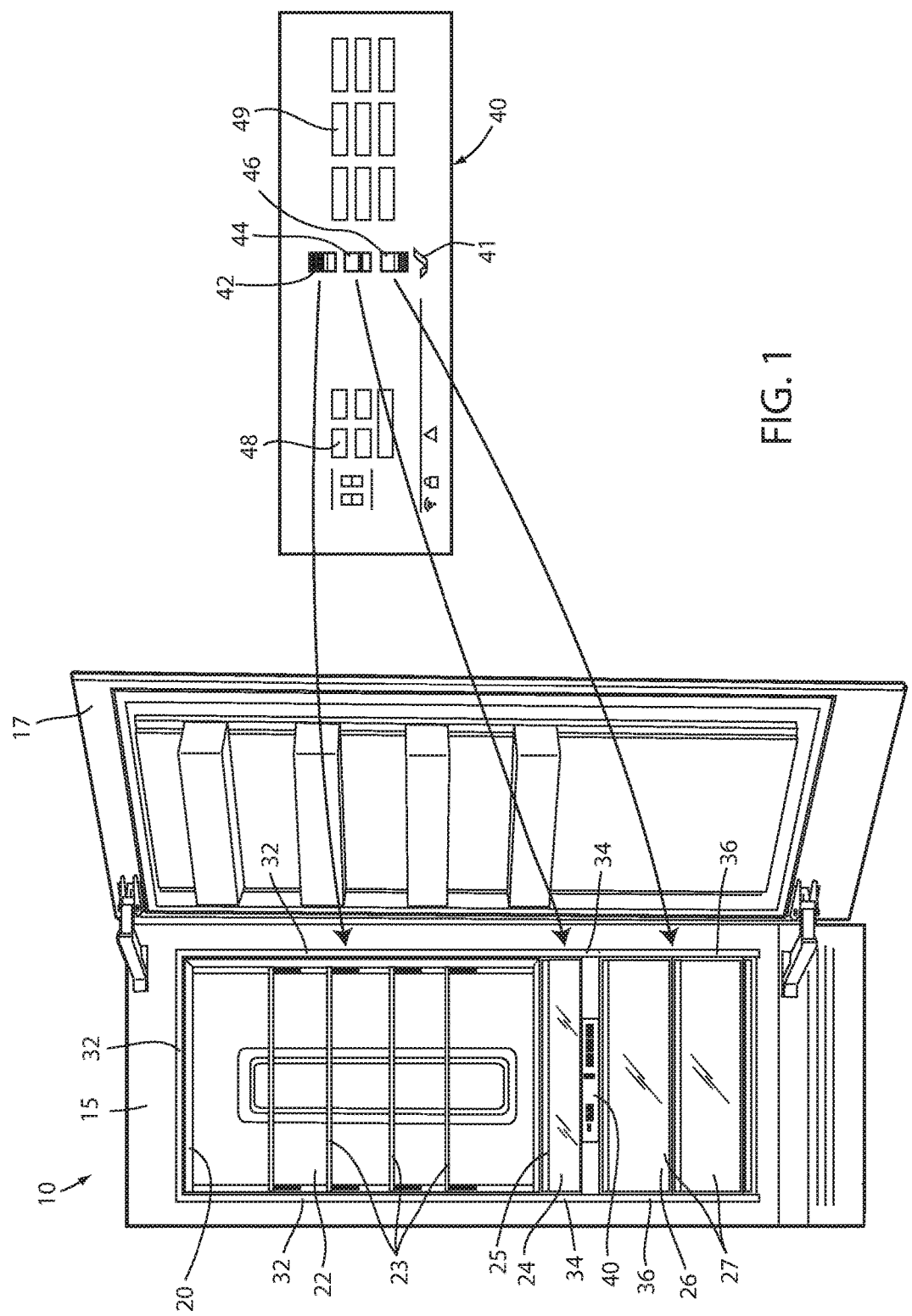
FIG. 1 is a front perspective view of a refrigerator according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, reference numeral 10 generally designates a refrigerator or refrigerator column. The refrigerator 10 includes a cabinet 15 in which at least one internal refrigerated compartment 20 is provided. At least one door 17 is provided for each internal refrigerated compartment 20 to selectively seal the compartment 20 or allow for a user to access the compartment 20. Each internal refrigerated compartment 20 may have a plurality of refrigeration zones 22, 24, and 26 for which the environment in each refrigeration zone may be independently controlled using a user interface 40 configured to receive a zone selection input 42, 44, and 46 from a user indicating at least one of the plurality of refrigeration zones 22, 24, and 26 in which the user desires to adjust the environment.

Refrigerator 10 may further include a plurality of lights provided in the internal refrigerated compartment 20 and disposed proximate each of the refrigeration zones 22, 24, and 26, wherein groups 32, 34, and 36 of the plurality of lights may be separately controlled for visually identifying each of the refrigeration zones 22, 24, and 26, respectively.

In addition, refrigerator may include a controller 100 (FIG. 2) coupled to the groups 32, 34, and 36 of the plurality of lights and in communication with the user interface 40. The controller may be configured to receive a zone selection input from the user interface 40; identify a group (32, 34, 36) of the plurality of lights that are disposed proximate the selected refrigeration zone(s) (22, 24, 26); and control the identified group (32, 34, 36) of the plurality of lights in a manner so as to visually confirm the selected refrigeration zone(s) (22, 24, 26).

In the particular example shown in the drawings, the internal refrigerated compartment 20 includes a first refrigeration zone 22, a second refrigeration zone 24, and a third refrigeration zone 26. First refrigeration zone 22 is located at the top of the internal refrigerated compartment 20 and is the largest zone in the refrigerator 10 and includes a plurality of shelves 23 that are generally used for storing an assortment of food products. Second refrigeration zone 24 is located at the middle of the internal refrigerated compartment 20 and includes a tray 25. Second zone 24 may be designated for use as either storage for deli products or produce. Third refrigeration zone 26 is located at the bottom of the internal refrigerated compartment 20 and includes crisper drawers 27. Third zone 26 may similarly be designated for use as either storage for deli products or produce.

Although three refrigeration zones 22, 24, and 26 are shown and described, the internal refrigerated compartment 20 may include any number of such zones. Moreover, the refrigeration zones may have different functions, uses, and arrangements than those shown and described herein. Further, although refrigerator 10 is shown with only one internal refrigerated compartment 20, it may have additional compartments, which may have their own respective doors 17. For example, refrigerator 10 may have a second internal refrigerated compartment for use as a freezer. In addition, the internal refrigerated compartment 20 shown may be used as a freezer. As used herein the term "refrigerator" shall mean any refrigerated appliance including not just refrigerators, but also freezers, combination refrigerators/freezers as well as refrigerated vending machines and refrigerated display cases. Further, although shown as an upright refrigerator, the refrigerator may be in the form of a chest or a walk-in refrigerator/freezer. Additionally, the refrigerator may be used for storing not only food products, but also any item that may be desired to be refrigerated or frozen. Lastly, the refrigerator 10 may be a home refrigerator, a commercial refrigerator, or a lab refrigerator.

As shown in the drawings, a first group of lights 32 is provided around the top and both sides of the perimeter of the first refrigeration zone 22, a second group of lights 34 is provided along both sides of the perimeter of the second refrigeration zone 24, and a third group of lights 36 is provided along both sides of the perimeter of the third refrigeration zone 26. In this manner, each group of lights 32, 34, and 36 identifies the boundaries of the associated refrigeration zone 22, 24, and 26.

Although the light groups 32, 34, and 36 are shown in the drawings as extending around the perimeter of the opening of the internal refrigerated compartment 20, the light groups may be disposed in any location and in any manner so as to provide visual confirmation of the refrigeration zone that is selected by the user. Although not necessary, it is desirable to have the light groups disposed in such a way as to visually indicate the boundaries of the respective refrigeration zones.

The refrigerator 10 may further include various shelves 23, trays 25, and drawers 27. Some of shelves 23, trays 25, and drawers 27 may separate one refrigerated zone from another. Although not shown in the drawings, one or more of the shelves 23, trays 25, and drawers 27 may have lights or a light pipe integrated along their outer edge as disclosed in commonly-assigned U.S. Patent Application Publication No. 2014/0268862 A1, the entire disclosure of which is incorporated by reference. Such edge lighting may be included in a group of lights (32, 34, and 36) to help identify the selected refrigeration zone (22, 24, and 26).

As also shown in FIG. 1, user interface 40 may include a zone selection input that allows the user to select one or more particular refrigeration zones for which the user may wish to adjust the environment. In the example shown, three separate zone selection inputs 42, 44, and 46 are shown with one input for each respective refrigeration zone 22, 24, and 26. As shown, user interface 40 is provided in the form of a touch screen display on which the three separate zone selection inputs 42, 44, and 46 are represented by three graphic icons that each graphically represents a different one of the three refrigeration zones 22, 24, and 26, respectively. The user interface 40 may further include inputs 48 for adjusting a parameter used to control the environment in the selected refrigeration zone(s). As described further below, these inputs 48 may be reconfigurable to show only those parameters that may be adjusted for the refrigeration zone(s) that is selected. The user interface 40 may also include a home input 41 used to activate the user interface 40 and/or return to a home screen. Further, additional inputs 49 may be provided for controlling the refrigerator. Inputs on the touch screen display serving as user interface 40 may be activated simply by touching a displayed icon wherein the touch may be sensed using capacitive sense switching. It should be noted that the user may select only one zone to control at a time or may select multiple zones for which a parameter is to be adjusted.

Although the user interface 40 is shown and described as a reconfigurable touch screen display, it may also be a fixed touch screen display or any other form of display. Further, user interface 40 may take any other form including a set of dedicated user input push buttons with or without indicator lights and backlighting. Moreover, although separate zone inputs 42, 44, and 46 are provided for each zone, a single zone selection input may be provided that toggles between the respective zones wherein the selected zone may or may not be displayed on the user interface 40. Additionally, the user interface 40 may be located inside or outside of the refrigerator 10. In the event it is located on the outside of the refrigerator, it may be advantageous to provide glass windows in the doors 17 such that the user may be able to see the interior compartment 20 and therefore see the visual confirmation of the zone selection provided by the interior lighting. Further, as described below, user interface 40 may be provided in a location remote from the refrigerator 10, such as within a smartphone 50 (FIGS. 2 and 5) or any other remote control device.

Figure 2:
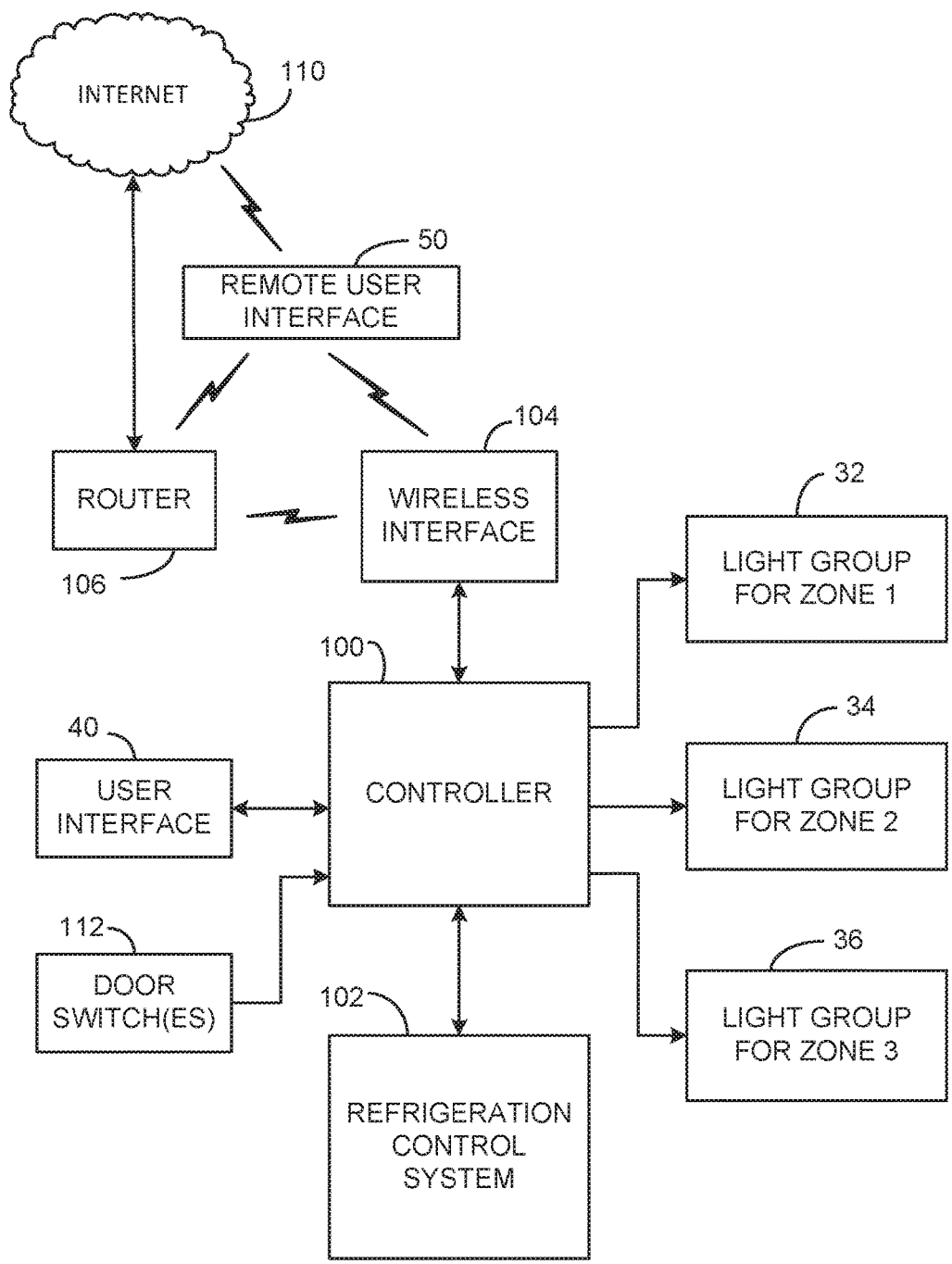
FIG. 2 is a block diagram of the electrical circuit used in the embodiments described herein.

FIG. 2 shows a block diagram of an electrical circuit for implementing the lighting scheme in the refrigerator 10 shown in FIG. 1. As shown, the circuit includes a controller 100 that is connected to the user interface 40 so as to receive zone selection inputs as well as other inputs such as parameter adjustment input to adjust a parameter for adjusting the environment of the selected refrigeration zone. Controller 100 may also be configured to control the display of user interface 40. The controller 100 is also coupled to the first group of lights 32, the second group of lights 34, and the third group of lights 36 for controlling the lighting generated by such light groups. For example, the controller 100 may independently activate and deactivate the groups of lights, change their intensity, modulate their intensity, and/or change their color. The lights in the light groups may be LEDs, which may have a single color or may be multi-color.

The controller 100 may also be coupled to the refrigeration control system 102, or be an integral part thereof, for carrying out the adjustments to the environments of the respective refrigeration zones 22, 24, and 26 as instructed through the user interface 40. The controller 100 may include a single processor or a plurality of processors distributed within the refrigerator and thus the functions described below may be performed by one processor or by two or more processors.

The controller 100 may also be coupled to one or more door switches 112, which signal when a door 17 is open.

Further, the electrical circuit may include a wireless interface 104 coupled to the controller 100 for allowing wireless communication with a remote user interface 50, which may be in the form of a remote control or a smartphone, tablet, laptop or desktop computer. The wireless interface 104 may provide for wireless communication using one or several communications protocols. For example, the wireless interface 104 may communicate directly with remote user interface 50 via IR or RF signals and may use a protocol such as BLUETOOTH or the like. Alternatively, the wireless interface 104 may communicate indirectly with remote user interface 50 via a Wi-Fi router 106 or via the Internet 110.

Having described the structural components of the refrigerator 10, a method of controlling interior lights of the refrigerator 10 will now be described with respect to FIG. 3. The method is described herein as being implemented by the controller 100 and may be stored in a memory associated with the controller 100 as a subroutine executed by the controller 100 (or more specifically, one or more processors of the controller 100 and/or refrigeration control system 102). The method may be embodied as a non-transitory computer readable medium having stored thereon software instructions that, when executed by the controller 100, cause the controller 100 to execute the steps of the method. In other words, aspects of the method may be achieved by software stored on a non-transitory computer readable medium or software modifications or updates to existing software residing in a non-transitory computer readable medium. Such software or software updates may be downloaded into a first non-transitory computer readable medium of the controller 100, typically prior to being installed in the refrigerator 10, from a second non-transitory computer readable medium remotely located from the first non-transitory computer readable medium associated with the controller 100. The second non-transitory computer readable medium may be in communication with the first non-transitory computer readable medium by any suitable means, which may at least partially include the Internet or a local or wide area wired or wireless network.

Figure 3:
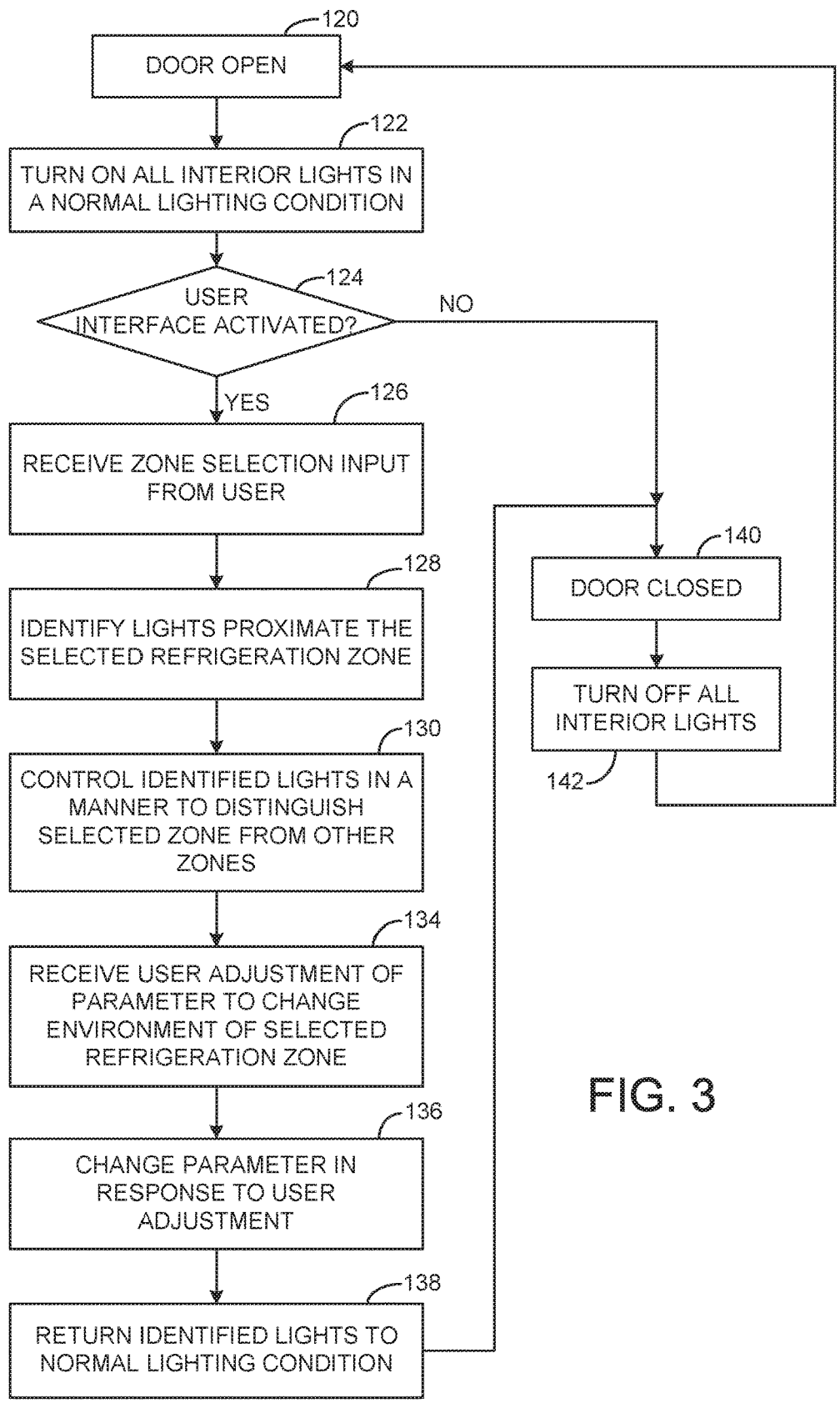
FIG. 3 is a flow chart illustrating the method performed by the controller of the electrical circuit in shown in FIG. 2.

As shown in FIG. 3, the method may begin at step 120, where the controller 100 determines if a door 17 is open based on a signal received from the door switch(es). Once a door 17 is open, the controller 100 may turn on all the interior light groups (groups 32, 34, and 36) in a normal lighting condition such that the user may readily see the items in the interior refrigerated compartment 20 (step 122). Then, in step 124, the controller 100 determines if the user interface 40 (or the remote user interface 50) has been activated. As noted above, this may be done by touching the user interface 40 on the home icon 41 or optionally anywhere on the touchscreen display serving as the user interface 40. If the user interface 40 has been activated (or if already active, if a zone is selected using icon 42, 44, or 46), the controller 100 receives any zone selection input from the user interface 40 in step 126. Next, in step 128, the controller 100 identifies which group of lights 32, 34, or 36 is associated with the selected refrigeration zone 22, 24, or 26. The controller 100 then controls the identified group of lights in such a manner as to visually distinguish the selected zone from the other zones in step 130.

As noted above, this may be by modulating the intensity of the light group associated with the selected zone, or by changing the color and/or brightness. One effective way in which to modulate the intensity of the group of lights is to slowly fade their intensity and then slowly bring their intensity back (which may be repeated several times). This gives the impression of breathing which emotes that the user has brought that zone to life. Further, the lighting of the associated zone selection icon 42, 44, 46 may be faded in intensity in the same manner and in synchronization with the fading in intensity of the group of lights 32, 34, 36 associated with the selected zone 22, 24, 26.

Figure 4A:
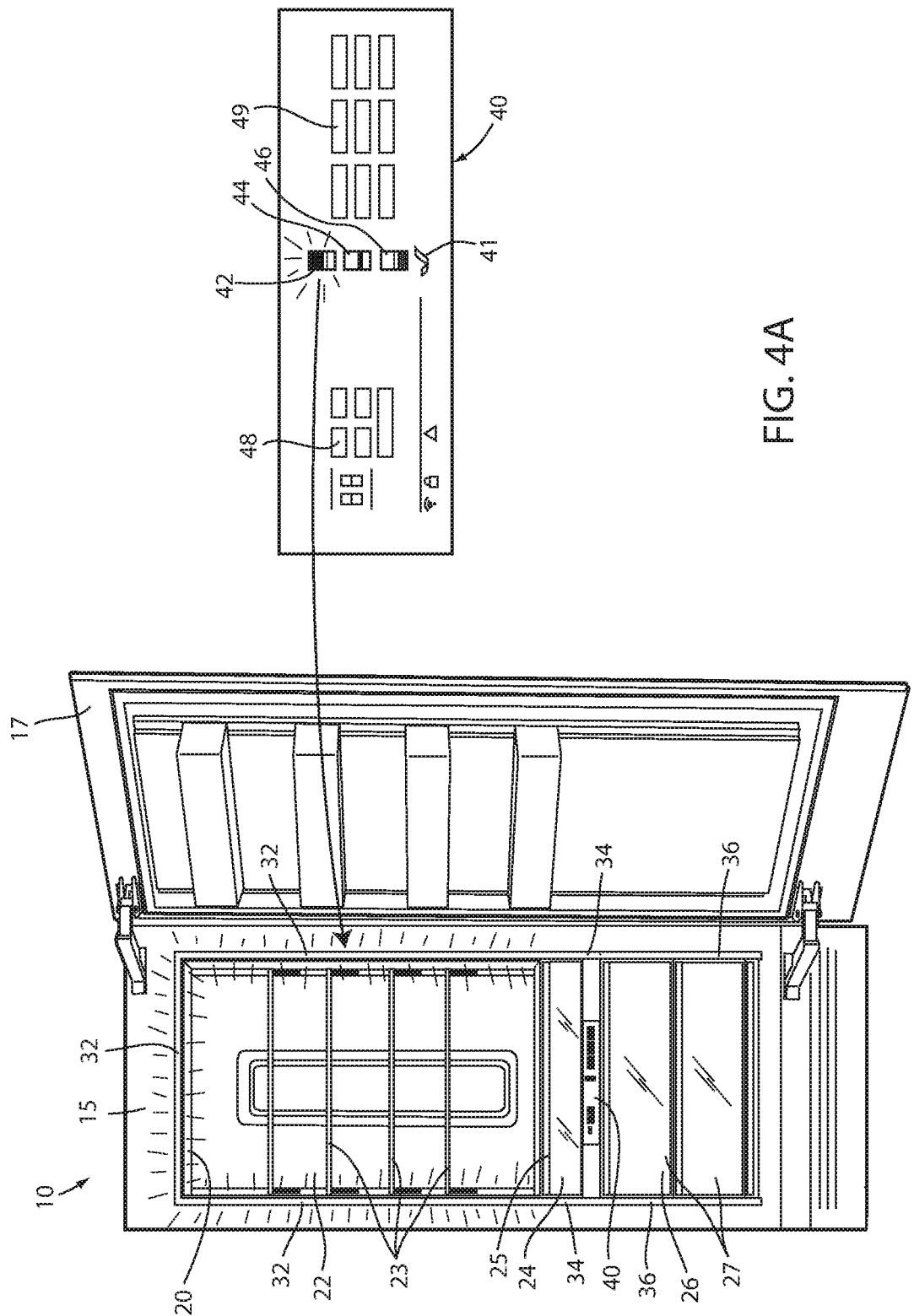
FIG. 4A is a front perspective view of the refrigerator shown in FIG. 1 with a first group of lights illuminated upon selection of a first refrigeration zone.
Figure 4B:
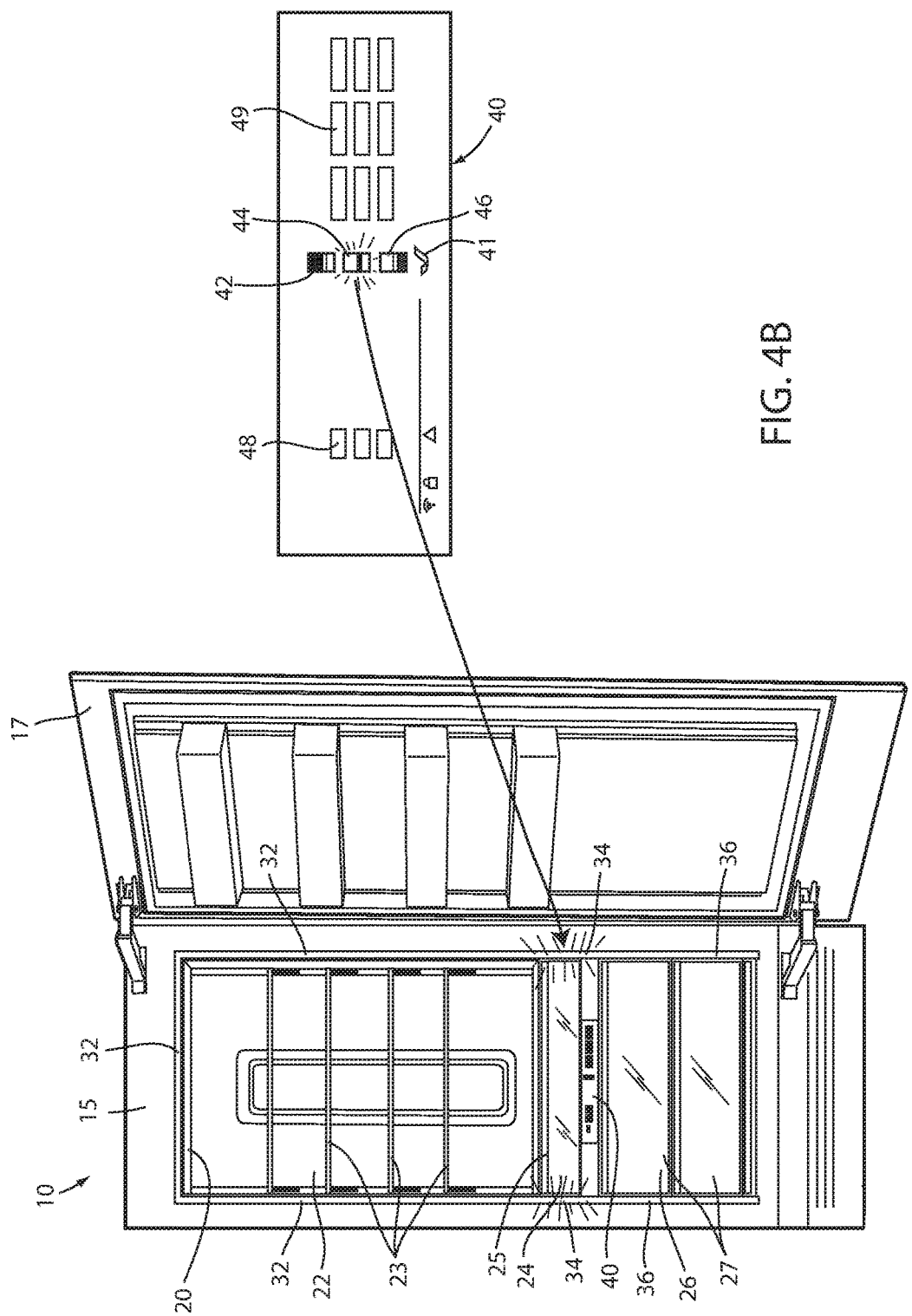
FIG. 4B is a front perspective view of the refrigerator shown in FIG. 1 with a second group of lights illuminated upon selection of a second refrigeration zone.
Figure 4C:
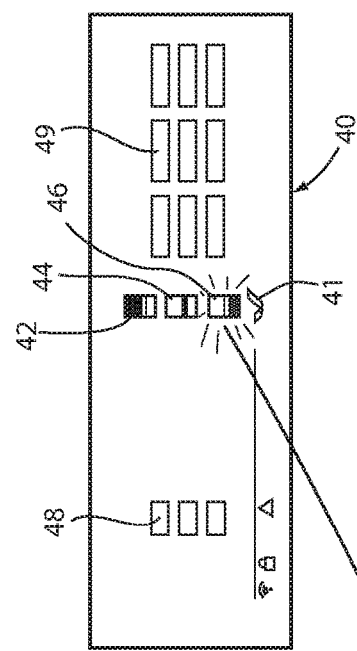
FIG. 4C is a front perspective view of the refrigerator shown in FIG. 1 with a third group of lights illuminated upon selection of a third refrigeration zone.
Figure 4C:
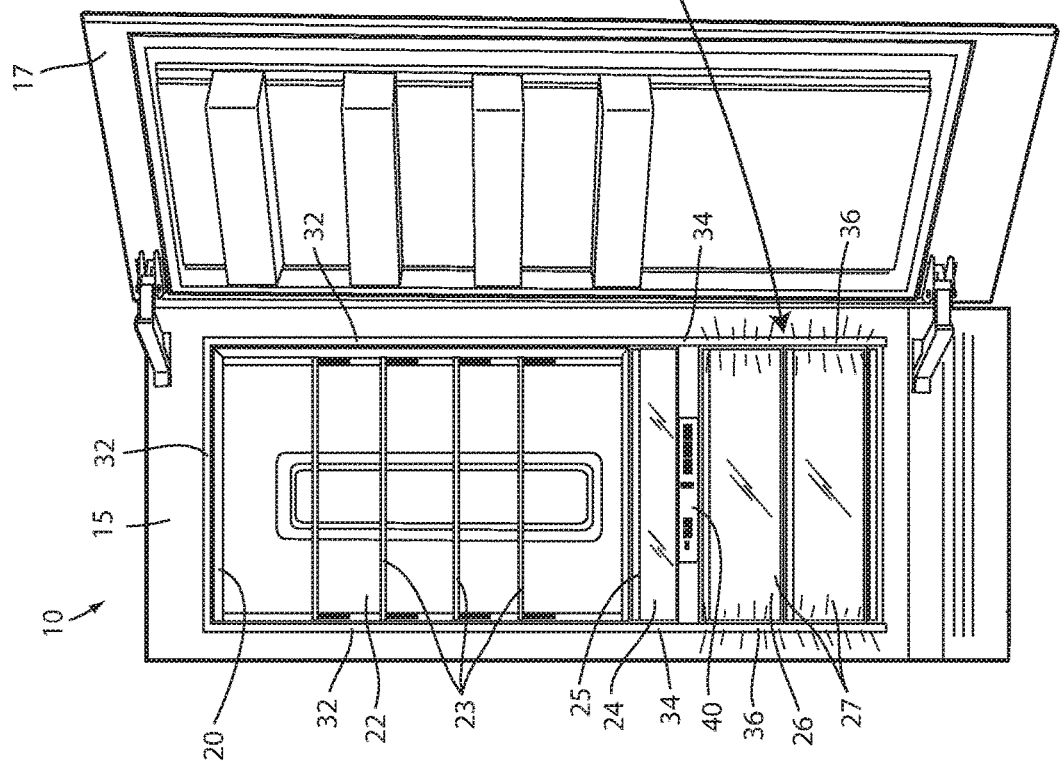

In step 134, the controller 100 receives any user adjustments of any parameters (via inputs 48) to change the environment of the selected refrigeration zone. In this regard, the controller 100 may cause the display on the user interface 40 to change so that only inputs 48 for those parameters that are relevant to the selected zone may be displayed. For example, as shown in FIG. 4A, when a user presses first zone selection icon 42, the icon is illuminated in a pulsing manner (or in a brighter manner or a different color) similar to the pulsing of the first group of lights 32 of the corresponding first refrigeration zone 22 that is selected. The user interface 40 then displays for inputs 48, the temperature at which the first refrigeration zone 22 is set along with inputs for adjusting the temperature up or down or for selecting Fahrenheit or Celsius. Similarly, inputs 49 may include "Max Cool," "Reset Filter*," "Vacation," "Sabbath" and "Lock*." On the other hand, if the user selects the second zone selection icon 44, the icon lighting is changed and the lighting of the second light group 34 is changed to confirm the user's selection of the second refrigeration zone 24 as shown in FIG. 4B. The user interface 40 then displays for inputs 48, a number of possible functions/uses for the second refrigeration zone 24, such as "Assorted," "Deli," "Produce," "Beverage," "Meat" or "Quick Chill." Selection of any one of these functions/uses may change the temperature setting for the second refrigeration zone 24 as well as the humidity level and possibly other environmental conditions. Similarly, inputs 49 may remain unchanged. If the user selects the third zone selection icon 46, the icon lighting is changed and the lighting of the third light group 36 is changed to confirm the user's selection of the third refrigeration zone 24 as shown in FIG. 4C. The user interface 40 then displays for inputs 48, a number of possible functions/uses for the third refrigeration zone 26, such as "Assorted" and "Produce." Note that the parameters need not be limited to any of the above parameters and the same or different parameters may be displayed for any or all zones.

Referring back to FIG. 3, in step 136, in response to any adjustment of a parameter via inputs 48, controller 100 takes whatever action is necessary to effect that adjustment whether it does so directly or indirectly by signaling the refrigeration control system 102. Then in step 138, once the action is completed, the controller 100 returns the light group for the selected refrigeration zone back to the normal lighting condition. If a zone is selected again, the controller 100 will repeat steps 126-136 for the selected zone.

After step 138 or if the controller 100 determines in step 124 that the user interface 40 has not been activated or touched, the controller 100 will check to see if the door 17 has been closed in step 140. If not the lights will remain on in their normal lighting condition. If the door is closed, the controller will turn off the interior light groups. Note that if any door includes a window, some or all the lights may remain on with the door closed either indefinitely or for a predetermined time.

Figure 5:
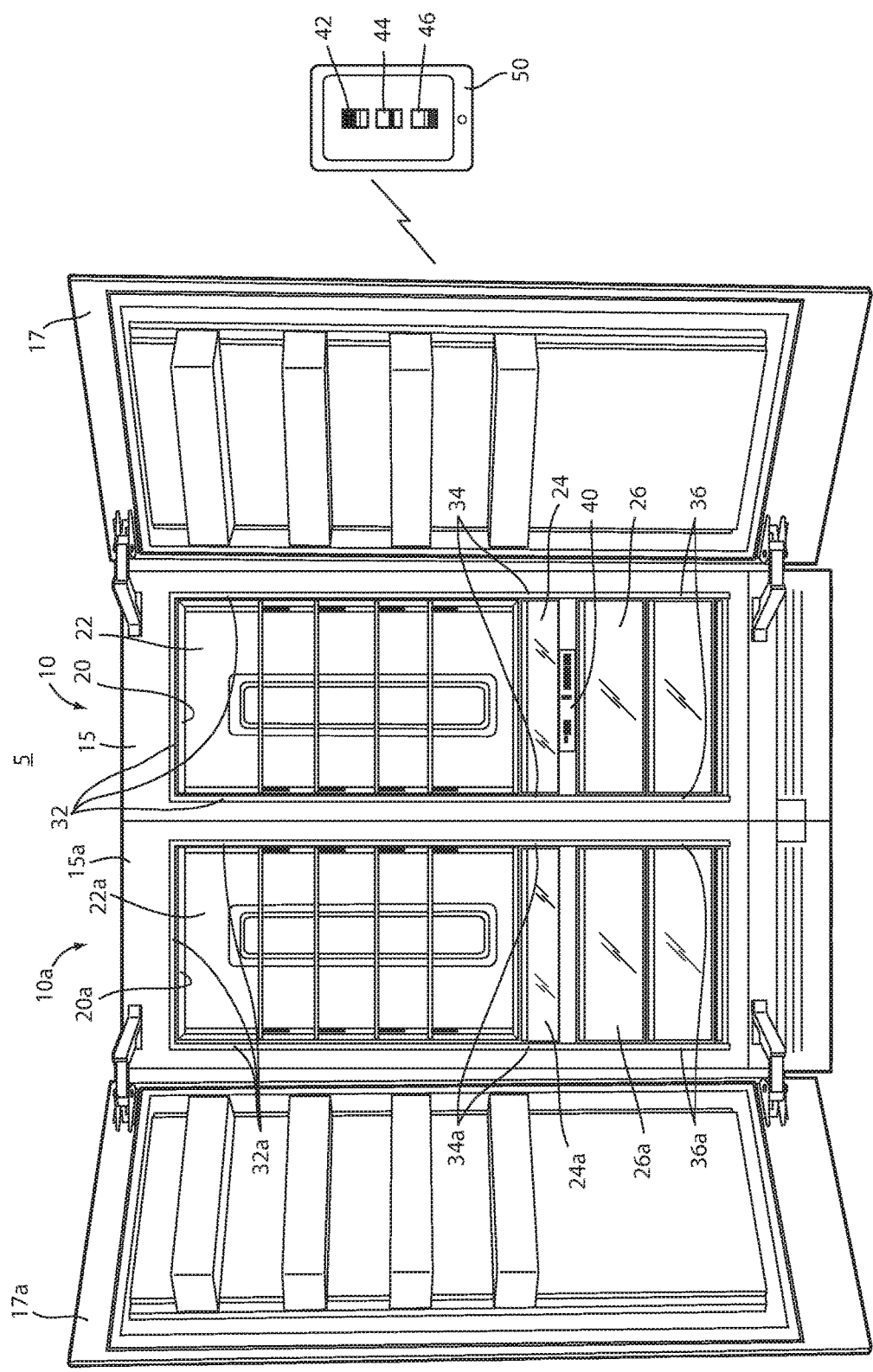
FIG. 5 is a refrigeration system including the refrigerator of FIG. 1 and a second refrigerator column.

FIG. 5 shows a refrigeration system 5 including two column refrigerators 10 and 10a arranged side by side. Note that the refrigerator column 10 is the same as the refrigerator shown above and refrigerator column 10a is similar in all respects except that it may or may not have its own user interface 40 (and possibly not its own controller 100). Accordingly, the similar parts of refrigerator column 10a share the same reference numerals with an appended "a." The purpose of showing this refrigeration system 5 is to demonstrate that a single user interface 40 (or remote user interface 50) may be used to control two separate refrigerator columns 10 and 10a if desired.

The lighting method described above may be used in other appliances in which it is useful to provide visual confirmation of one of a plurality of different zones. For example, the above described lighting scheme may be used in solid-state microwave cooking appliances in which there may be different cooking zones where food may be cooked differently than food in another zone. An example of such a cooking appliance is described in commonly-assigned U.S. Pat. No. 6,884,979, the entire disclosure of which is incorporated by reference.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerator comprising:
a cabinet having at least one internal refrigerated compartment in which a plurality of refrigeration zones are provided, wherein an environment in each refrigeration zone may be independently controlled;
a door pivotally coupled to the cabinet and associated with the at least one internal refrigerated compartment, wherein when the door is opened, access is provided for a user to the associated at least one internal refrigerated compartment and to each of the plurality of refrigeration zones provided therein;
a plurality of lights provided in the internal refrigerated compartment and disposed along at least two sides of the perimeter of each of the plurality of refrigeration zones, wherein groups of the plurality of lights are configured to be separately controlled for visually identifying boundaries of each of the refrigeration zones;
a user interface configured to receive a zone selection input from a user indicating at least one of the plurality of refrigeration zones in which the user desires to adjust the environment and indicating a parameter that changes the environment in the selected at least one of the plurality of refrigeration zones; and
a controller coupled to the plurality of lights and the user interface, the controller is configured to:
receive a zone selection input from the user interface;
identify a group of the plurality of lights that are disposed about the boundary of the selected at least one of the plurality of refrigeration zones;
control the identified group of the plurality of lights in a manner so as to visually confirm the boundaries of the selected at least one of the plurality of refrigeration zones; and
control at least one component so as to adjust the parameter and thereby change the environment in the selected at least one of the plurality of refrigeration zones.

2. The refrigerator of claim 1, wherein the parameter that may be adjusted to change the environment in the selected at least one of the plurality of refrigeration zones is a temperature setting.

3. The refrigerator of claim 1, wherein the parameter that may be adjusted to change the environment in the selected at least one of the plurality of refrigeration zones is a use setting.

4. The refrigerator of claim 1, wherein the controller controls the group of lights that is associated with the selected at least one of the plurality of refrigeration zones by changing the color of the group of lights so as to visually confirm the boundaries of the selected at least one of the plurality of refrigeration zones.

5. The refrigerator of claim 1, wherein the controller controls the group of lights that is associated with the selected at least one of the plurality of refrigeration zones by changing the brightness of the group of lights so as to visually confirm the boundaries of the selected at least one of the plurality of refrigeration zones.

6. The refrigerator of claim 1, wherein the controller controls the group of lights that is associated with the selected at least one of the plurality of refrigeration zones by modulating the intensity of the group of lights so as to visually confirm the boundaries of the selected at least one of the plurality of refrigeration zones.

7. The refrigerator of claim 1, wherein the user interface is disposed within the internal refrigerated compartment.

8. The refrigerator of claim 1, wherein at least one of the plurality of refrigeration zones includes a shelf that divides the at least one of the plurality of refrigeration zones.

9. A refrigerator comprising:
a cabinet having at least one internal refrigerated compartment in which a plurality of refrigeration zones are provided, wherein an environment in each refrigeration zone is configured to be independently controlled using a user interface configured to receive a zone selection input from a user indicating at least one of the plurality of refrigeration zones in which the user desires to adjust the environment, and wherein at least one of the plurality of refrigeration zones includes a shelf that divides the at least one of the plurality of refrigeration zones;
a door pivotally coupled to the cabinet and associated with the at least one internal refrigerated compartment, wherein when the door is opened, access is provided for a user to the associated at least one internal refrigerated compartment and to each of the plurality of refrigeration zones provided therein;
a plurality of lights provided in the internal refrigerated compartment and disposed along at least two sides of the perimeter of each of the plurality of refrigeration zones, wherein groups of the plurality of lights are configured to be separately controlled for visually identifying each of the refrigeration zones; and
a controller coupled to the plurality of lights and in communication with the user interface, the controller is configured to:
receive a zone selection input from the user interface;
identify a group of the plurality of lights that are disposed proximate the selected at least one of the plurality of refrigeration zones; and
control the identified group of the plurality of lights in a manner so as to visually confirm the selected at least one of the plurality of refrigeration zones.

10. The refrigerator of claim 9 and further comprising a wireless interface coupled to the controller for wirelessly communicating with the user interface, which is remote from the refrigerator.

11. The refrigerator of claim 9, wherein the user interface is disposed within the internal refrigerated compartment.

12. The refrigerator of claim 9, wherein the plurality of lights are disposed around boundaries of each of the plurality of refrigeration zones, wherein the groups of the plurality of lights may be separately controlled for visually identifying the boundaries of each of the refrigeration zones.

13. The refrigerator of claim 12, wherein the controller controls the group of lights that is associated with the selected at least one of the plurality of refrigeration zones by changing the color of the group of lights so as to visually confirm the boundaries of the selected at least one of the plurality of refrigeration zones.

14. The refrigerator of claim 12, wherein the controller controls the group of lights that is associated with the selected at least one of the plurality of refrigeration zones by changing the brightness of the group of lights so as to visually confirm the boundaries of the selected at least one of the plurality of refrigeration zones.

15. The refrigerator of claim 12, wherein the controller controls the group of lights that is associated with the selected at least one of the plurality of refrigeration zones by modulating the intensity of the group of lights so as to visually confirm the boundaries of the selected at least one of the plurality of refrigeration zones.

16. The refrigerator of claim 9, wherein the user interface includes a first input for selection of at least one of the plurality of refrigeration zones and a second input for adjustment of a parameter that changes the environment in the selected at least one of the plurality of refrigeration zones.

17. The refrigerator of claim 16, wherein the parameter that may be adjusted to change the environment in the selected at least one of the plurality of refrigeration zones is a temperature setting.

18. The refrigerator of claim 16, wherein the parameter that may be adjusted to change the environment in the selected at least one of the plurality of refrigeration zones is a use setting.

19. The refrigerator of claim 16, wherein the controller is further configured to:
receive a second input for adjustment of a parameter; and
in response to the second input for adjustment of a parameter, control at least one component so as to adjust the parameter and thereby change the environment in the selected at least one of the plurality of refrigeration zones.

* * * * *